(12) United States Patent
Jang et al.

(10) Patent No.: US 11,046,845 B2
(45) Date of Patent: Jun. 29, 2021

(54) POLYPROPYLENE RESIN COMPOSITION FOR UNCOATED CRASH PAD

(71) Applicants: Hyundai Motor Company, Seoul (KR); Kia Motors Corporation, Seoul (KR); Hanwha Total Petrochemical Co. Ltd., Chungcheongnam-do (KR)

(72) Inventors: Kyeong Hoon Jang, Seoul (KR); Boo Youn An, Seoul (KR); In Soo Han, Gyeonggi-do (KR); Dae Sik Kim, Gyeonggi-do (KR); Seul Yi, Seoul (KR); Byoung Ho Lee, Chungcheongnam-Do (KR); Choul Ho Kim, Daejeon (KR)

(73) Assignees: Hyundai Motor Company, Seoul (KR); Kia Motors Corporation, Seoul (KR); Hanwha Total Petrochemical Co. Ltd., Seonsan (KR)

( * ) Notice: Subject to any disclaimer, the term of this patent is extended or adjusted under 35 U.S.C. 154(b) by 110 days.

(21) Appl. No.: 16/165,278

(22) Filed: Oct. 19, 2018

(65) Prior Publication Data

US 2019/0169419 A1 Jun. 6, 2019

(30) Foreign Application Priority Data

Dec. 5, 2017 (KR) .................. 10-2017-0165532

(51) Int. Cl.
| | |
|---|---|
| *C08L 53/00* | (2006.01) |
| *C08K 3/34* | (2006.01) |
| *F16F 7/00* | (2006.01) |
| *C08L 23/12* | (2006.01) |
| *F16F 1/36* | (2006.01) |

(52) U.S. Cl.
CPC ............ *C08L 53/00* (2013.01); *C08K 3/346* (2013.01); *C08L 23/12* (2013.01); *F16F 1/3605* (2013.01); *F16F 7/00* (2013.01); *C08L 2205/025* (2013.01); *C08L 2205/035* (2013.01)

(58) Field of Classification Search
CPC ...................................................... C08L 53/00
See application file for complete search history.

(56) References Cited

U.S. PATENT DOCUMENTS

| | | | | |
|---|---|---|---|---|
| 5,432,209 A | * | 7/1995 | Sobajima | ................. C08K 9/04 523/200 |
| 6,441,081 B1 | * | 8/2002 | Sadatoshi | ........... C08F 297/083 524/451 |

FOREIGN PATENT DOCUMENTS

| | | |
|---|---|---|
| KR | 10-0898046 B1 | 5/2009 |
| KR | 2017127656 A * | 11/2017 |

OTHER PUBLICATIONS

Machine translation of KR 898046 B1, published May 19, 2009. (Year: 2009).*

* cited by examiner

*Primary Examiner* — Vickey Nerangis
(74) *Attorney, Agent, or Firm* — Mintz Levin Cohn Ferris Glovsky and Popeo, P.C.; Peter F. Corless

(57) ABSTRACT

Disclosed is a polypropylene resin composition for an uncoated crash pad. The composition may include an amount of about 50 to 80 wt % of a polypropylene resin having a Polydispersity Index (PI) of about 4.5 to 6.5, a weight average molecular weight of about 200,000 to 350,000 g/mol, and an isotactic peptide fraction of about 96% or greater as measured by a $C^{13}$-NMR method, an amount of about 1 to 30 wt % of rubber having a melt index of about 1 to 6 g/10 min (230° C., 2.16 Kg), an amount of about 11 to 30 wt % of an inorganic filler composed of a mixture of an amount of about 10 to 20 wt % of talc and an amount of about 1 to 10 wt % of whisker, and an amount of about 1 to 5 wt % of an anti-scratch agent, all the wt % are based on the total weight of the polypropylene resin composition.

9 Claims, 1 Drawing Sheet

POLYPROPYLENE RESIN COMPOSITION FOR UNCOATED CRASH PAD

CROSS-REFERENCE TO RELATED APPLICATION

This application claims under 35 U.S.C. § 119(a) the benefit of priority to Korean Patent Application No. 10-2017-0165532 filed on Dec. 5, 2017, the entire contents of which are incorporated herein by reference.

TECHNICAL FIELD

The present invention relates to a polypropylene resin composition for an uncoated crash pad. The polypropylene resin composition for an uncoated crash pad may include a polypropylene resin including a mixture of polypropylene resins having different melt indexes and molecular weight distributions, a rubber component including a mixture of ethylene-octene-based rubber and styrene-ethylene-butadiene-styrene (SEBS)-based rubber, an inorganic filler including talc and whisker, and an anti-scratch agent including a mixture of synthetic silicone and modified polyethylene wax thereby exhibiting a good appearance and improved properties such as rigidity, impact resistance and scratch resistance.

BACKGROUND OF THE INVENTION

A conventional crash pad for hard IP has been improved in the appearance and scratch resistance of a part thereof by coating a crash pad main panel, which is an injected part. In this case, however, the processing cost of products may be increased due to the coating process.

In order to use a crash pad without a coating process, appearance and high scratch resistance of the part may need to be improved. Conventionally, among polypropylene resin compositions developed as vehicle interior materials, products having improved properties, such as impact resistance, strength, and the like, have been commercially available, but still in an uncoated state, the appearance and scratch resistance may not be improved simultaneously.

Thus, it is required to develop a novel material in order to improve on a poor appearance caused by omitting the conventional coating process and also to increase scratch resistance.

SUMMARY OF THE INVENTION

In preferred aspects, provided herein is a polypropylene resin that may include i) a polypropylene resin preferably including different polypropylene components having different melt indexes and molecular weight distributions; ii) a rubber component that may include a mixture of ethylene-octene-based rubber and SEBS-based rubber; iii) an inorganic filler comprising talc and/or whisker; and/or iv) an anti-scratch agent that may suitably include a mixture of synthetic silicone and modified polyethylene wax at an appropriate ratio. In preferred aspect, the present invention may provide improvement on a poor appearance and also increasing rigidity, impact resistance and scratch resistance of parts, obtained from the polypropylene resin described herein.

The melt indexes of the polypropylene components may be different by about 1 g/10 min (230° C., 2.16 Kg), by about 2 g/10 min (230° C., 2.16 Kg), by about 4 g/10 min (230° C., 2.16 Kg), by about 10 g/10 min (230° C., 2.16 Kg), by about 15 g/10 min (230° C., 2.16 Kg), by about 20 g/10 min (230° C., 2.16 Kg), by about 25 g/10 min (230° C., 2.16 Kg), or by about 30 g/10 min (230° C., 2.16 Kg). Alternatively, the melt indexes of the polypropylene components may be different by about 10% or greater, by about 20% or greater, by about 50% or greater, by about 60% or greater, by about 70% or greater, by about 80% or greater, by about 90% or greater, or by about 100% or greater of the melt index having less value. In addition, the melt indexes of the polypropylene components may be different by about 1.5 fold or greater, by about 2 fold or greater, by about 3 fold or greater, by about 5 fold or greater, by about 10 fold or greater, by about 15 fold or greater, or by about 20 fold or greater of the melt index having less value.

Accordingly, the present invention may provide a polypropylene resin composition for an uncoated crash pad, in which a good appearance may be exhibited and in which properties such as rigidity, impact resistance and scratch resistance may be improved.

In one aspect, provided is a polypropylene resin composition for an uncoated crash pad, that may include: an amount of about 50 to 80 wt % of a polypropylene resin having a Polydispersity Index (PI) of about 4.5 to 6.5, a weight average molecular weight of about 200,000 to 350,000 g/mol, and an isotactic peptide fraction of about 96% or greater as measured by a $C^{13}$-NMR method; an amount of about 1 to 30 wt % of rubber having a melt index of about 1 to 6 g/10 min (230° C., 2.16 Kg); an amount of about 11 to 30 wt % of an inorganic filler including a mixture of an amount of about 10 to 20 wt % of talc and an amount of about 1 to 10 wt % of whisker; and 1 to 5 wt % of an anti-scratch agent. All the wt % of the components are based on the total weight of the polypropylene resin. In certain preferred aspect, the polypropylene resin may be a high crystalline polypropylene. For example, the high crystalline propylene may have higher isotactic index than standard homopolymer resins (e.g., higher than 10 times, higher than 20 times or higher than 30 times) and thus exhibiting a significantly higher stiffness and excellent chemical and heat resistance.

The polypropylene resin may suitably be a mixture of homopolypropylene and block copolypropylene.

The homopolypropylene may suitably have a molecular weight distribution (MWD) of about 6 to 8. The homopolypropylene may suitably have a melt index of about 10 to 30 g/10 min (230° C., 2.16 Kg). The homopolypropylene may suitably have a weight average molecular weight of about 200000 to 250000 g/mol. The block copolypropylene may suitably have a molecular weight distribution (MWD) of about 7 to 12. The block copolypropylene may suitably have a melt index of about 20 to 100 g/10 min (230° C., 2.16 Kg). The block copolypropylene may suitably have a weight average molecular weight of about 200000 to 350000 g/mol.

Preferably, the homopolypropylene may have a molecular weight distribution (MWD) of about 6 to 8, a melt index of about 10 to 30 g/10 min (230° C., 2.16 Kg), and a weight average molecular weight of about 200000 to 250000 g/mol. Preferably, the block copolypropylene has a molecular weight distribution (MWD) of about 7 to 12, a melt index of about 20 to 100 g/10 min (230° C., 2.16 Kg), and a weight average molecular weight of about 200000 to 350000 g/mol.

The block copolypropylene may suitably be a mixture of (i) block copolypropylene having a melt index of about 20 to 40 g/10 min (230° C., 2.16 Kg) and a weight average molecular weight of about 200000 to 350000 g/mol and (ii) block copolypropylene having a melt index of 60 to 100 g/10 min (230° C., 2.16 Kg) and a weight average molecular weight of 200000 to 250000 g/mol.

The rubber component may suitably include ethylene-octene (EO)-based rubber and styrene-ethylene-butadiene-styrene (SEBS)-based rubber which are mixed at a weight ratio of about 1:1.

The talc may suitably have an average particle diameter of about 0.1 to 1 μm. The whisker may suitably have an aspect ratio of about 10 to 50 and an acicular shape.

The polypropylene resin composition may suitably have a melt index of 25 to 43 g/10 min (230° C., 2.16 Kg), a flexural modulus of 1500 to 2300 MPa, and an Izod impact strength of 450 to 510 J/m.

Further provided herein is a polypropylene resin composition that may consist essentially of, essentially consist of, or consist of the components of the compositions as described herein. For example, the polypropylene resin composition may consist essentially of, essentially consist of, or consist of: an amount of about 50 to 80 wt % of a polypropylene resin having a Polydispersity Index (PI) of about 4.5 to 6.5, a weight average molecular weight of about 200,000 to 350,000 g/mol, and an isotactic peptide fraction of about 96% or greater as measured by a $C^{13}$-NMR method; an amount of about 1 to 30 wt % of rubber having a melt index of about 1 to 6 g/10 min (230° C., 2.16 Kg); an amount of about 11 to 30 wt % of an inorganic filler including a mixture of an amount of about 10 to 20 wt % of talc and an amount of about 1 to 10 wt % of whisker; and 1 to 5 wt % of an anti-scratch agent. All the wt % of the components are based on the total weight of the polypropylene resin.

In other aspect, provided is a molded article that may include the polypropylene resin composition as described herein. Still further provided is a vehicle that may include the polypropylene resin composition as described herein.

The polypropylene resin composition may suitably include a polypropylene resin including a mixture of polypropylene resins (e.g., first and second polypropylene resins) having different melt indexes and molecular weight distributions and a rubber component including a mixture of ethylene-octene-based rubber and SEBS-based rubber, thus maximizing the resin flowability to thereby effectively reduce appearance problems, such as flow marks, weld lines, etc., ultimately exhibiting a good appearance.

Also, in the polypropylene resin composition according to various exemplary embodiments of the present invention, an inorganic filler including a mixture of talc and whisker and an anti-scratch agent including a mixture of synthetic silicone and modified polyethylene wax may be mixed at an appropriate ratio, thereby increasing not only the rigidity and impact resistance of parts but also the scratch resistance thereof.

Furthermore, the polypropylene resin composition of the present invention may have a reduced weight due to a decrease in density, and may facilitate release from a mold, and the amount of inorganic material such as filler may be reduced compared to a conventional coating process. In addition, because a coating process is omitted, manufacturing process may become simple, thereby reducing processing costs and also preventing indoor air pollution from occurring during the coating process.

Figure 1:
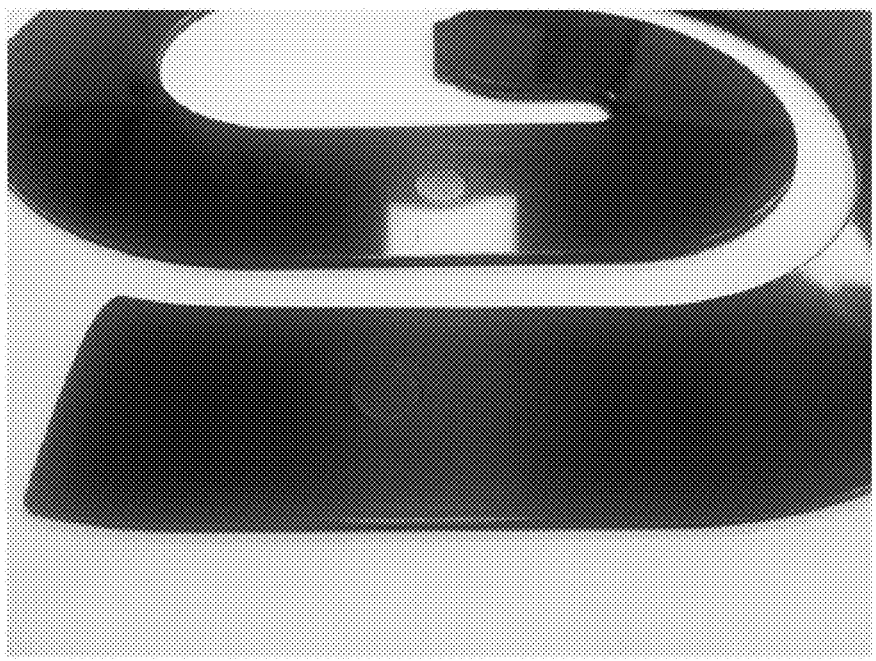
FIG. 1 is a photograph showing an exemplary surface appearance of a test specimen using an exemplary polypropylene resin composition of Example 1 according to an exemplary embodiment of the present invention.
Figure 2:
FIG. 2 is a photograph showing the surface appearance of a test specimen using a polypropylene resin composition of Comparative Example 4 according to the present invention.

Notably, the white reflections shown in the photographs of FIGS. 1 and 2 are not part of the present invention.

DETAILED DESCRIPTION

As used herein, the singular forms "a," "an" and "the" are intended to include the plural forms as well, unless the context clearly indicates otherwise. It will be further understood that the terms "comprise", "include", "have", etc. when used in this specification, specify the presence of stated features, regions, integers, steps, operations, elements and/or components but do not preclude the presence or addition of one or more other features, regions, integers, steps, operations, elements, components, and/or combinations thereof.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a detailed description will be given of an embodiment of the present invention.

According to the present invention, a polypropylene resin composition for an uncoated crash pad may include an amount of about 50 to 80 wt % of a polypropylene resin having a PI (Polydispersity Index) of about 4.5 to 6.5, a weight average molecular weight of about 200000 to 350000 g/mol, and an isotactic peptide fraction of about 96% or greater as measured by a $C^{13}$-NMR method; an amount of about 1 to 30 wt % of rubber having a melt index of an amount of about 1 to 6 g/10 min (230° C., 2.16 Kg); an amount of about 11 to 30 wt % of an inorganic filler including a mixture of an amount of about 10 to 20 wt % of talc and an amount of about 1 to 10 wt % of whisker; and an amount of about 1 to 5 wt % of an anti-scratch agent, all the wt % are based on the total weight of the polypropylene composition.

In a preferred embodiment of the present invention, the polypropylene resin may include a highly crystalline polypropylene resin having a high isotactic index, crystallinity increasing with an increase in the isotactic index. Preferably, a resin having a high isotactic peptide fraction of about 96% or greater as measured by a $C^{13}$-NMR method is used. Furthermore, the highly crystalline polypropylene resin has a PI (Polydispersity Index) of about 4.5 to 6.5. When the PI is less than about 4.5, a poor appearance, such as flow marks, may result. On the other hand, when the PI is greater than about 6.5, properties such as rigidity may deteriorate. The highly crystalline polypropylene resin preferably has a weight average molecular weight of about 200000 to 350000 g/mol.

The highly crystalline polypropylene resin may include a mixture of homopolypropylene and block copolypropylene. For example, the homopolypropylene may have a wide molecular weight distribution (MWD) of about 6 to 8, a weight average molecular weight of about 200000 to 250000 g/mol, and/or a melt index of about 10 to 30 g/10 min (230° C., 2.16 Kg), thus enhancing rigidity. When the molecular weight distribution of the homopolypropylene is less than about 6, injection moldability may become poor. On the other hand, when the molecular weight distribution thereof is greater than about 8, rigidity may become poor. Also, when the melt index is less than about 10 g/10 min, flowability may decrease. On the other hand, when the melt index is greater than about 30 g/10 min, elasticity may decrease. Preferably, the melt index falls in the range of about 15 to 25 g/10 min (230° C., 2.16 Kg).

Here, the molecular weight distribution (MWD) may be a value obtained by dividing a weight average molecular weight (Mw) by a number average molecular weight (Mn), and such a molecular weight distribution is significantly associated with processing moldability and properties. As the molecular weight distribution (MWD) is decreased, rigidity and impact resistance may be efficiently balanced, but injection moldability may decrease. On the other hand, when the molecular weight distribution (MWD) increases, injection moldability may become good but rigidity may decrease.

The block copolypropylene may be a block copolypropylene obtained by copolymerizing about 85 to 90 wt % of homopolypropylene and about 10 to 15 wt % of ethylene-propylene. As such, the amount of ethylene may be in an amount of about 3 to 8 wt % based on the total amount of block copolypropylene. The block copolypropylene may have a wide molecular weight distribution (MWD) of about 7 to 12, a melt index of about 20 to 100 g/10 min (230° C., 2.16 Kg), and/or a weight average molecular weight of about 200000 to 350000 g/mol. When the molecular weight distribution of the block copolypropylene is less than about 7, impact resistance is improved but processability is deteriorated. On the other hand, when the molecular weight distribution thereof is greater than about 12, flowability may be improved but rigidity may become poor.

In order to reduce flow marks that are easily observed in medium- to large-sized parts, two block copolypropylene resins having different wide molecular weight distributions and melt indexes may be mixed to thus improve an appearance. For example, a mixture of (i) block copolypropylene having a melt index of 20 to 40 g/10 min (230° C., 2.16 Kg) and a weight average molecular weight of 200000 to 350000 g/mol and (ii) block copolypropylene having a melt index of 60 to 100 g/10 min (230° C., 2.16 Kg) and a weight average molecular weight of 200000 to 250000 g/mol may be preferably used.

When the melt index of the (i) block copolypropylene having a molecular weight distribution (MWD) of 7 or greater is less than about 20 g/10 min, fluidity may decrease. On the other hand, when the melt index thereof is greater than about 40 g/10 min, impact performance may decrease. Preferably the melt index may be in the range of about 25 to 35 g/10 min (230° C., 2.16 Kg).

Also, when the melt index of the (ii) block copolypropylene is less than about 60 g/10 min, injection moldability may decrease. On the other hand, when the melt index thereof is greater than about 100 g/10 min, fluidity may increase but impact resistance may decrease. Preferably the melt index thereof may be in the range of about 70 to 90 g/10 min (230° C., 2.16 Kg).

Preferably, the highly crystalline polypropylene resin may be prepared by mixing homopolypropylene, block copolypropylene having a melt index of about 20 to 40 g/10 min (230° C., 2.16 Kg), and block copolypropylene having a melt index of about 60 to 100 g/10 min (230° C., 2.16 Kg) at a weight ratio of about 1:1:3 to 6, or particularly, at a weight ratio of about 1:1:3.6 to 5.7.

In a preferred embodiment of the present invention, in order to improve impact resistance at a low temperature (−30° C.), the rubber may be used in the form of a mixture of ethylene-octene-based rubber and styrene-ethylene-butadiene-styrene-based rubber. Preferably, ethylene-octene (EO) rubber and styrene-ethylene-butadiene-styrene (SEBS) rubber may be mixed at a weight ratio of about 1:1.

When the above two rubber components are mixed, flexibility suitable for use in an uncoated crash pad may be obtained, and impact strength, such as low-temperature impact performance, may also be improved. The rubber is used in an amount of about 1 to 30 wt %. When the amount thereof is less than about 1 wt %, low-temperature impact performance may become insignificant and defects such as burrs may be generated on the surface of parts. On the other hand, if the amount thereof is greater than about 30 wt %, rigidity and heat resistance may decrease due to the use of an excess of rubber, and flow marks may be generated on the surface of parts.

In a preferred embodiment of the present invention, in order to improve the rigidity of the polypropylene resin composition, the inorganic filler may be used in the form of a mixture of talc having an average particle diameter of about 0.1 to 1 μm and acicular whisker having an aspect ratio of about 10 to 50. The amount of the inorganic filler may be about 11 to 30 wt %. When the amount thereof is less than about 11 wt %, a flexural modulus may decrease. On the other hand, when the amount thereof is greater than about 30 wt %, impact resistance may decrease.

Preferably, talc having an average particle diameter as small as about 0.1 to 1 μm may be suitably used in order to increase both rigidity and impact performance. When the average particle diameter of the talc is less than about 0.1 μm, dispersion may not be performed upon extrusion processing. On the other hand, when the average particle diameter thereof is greater than about 1 μm, rigidity and impact performance may decrease. Furthermore, when the amount of the talc is included in an amount less than about 10 wt %, rigidity may decrease. On the other hand, when the amount thereof is included in an amount of greater than about 20 wt %, impact strength may decrease and scratch resistance may become poor. Preferably, talc having an average particle diameter of about 0.3 to 0.7 μm may be used.

In a preferred embodiment of the present invention, the whisker has an aspect ratio of about 10 to 50 and an acicular shape. When the aspect ratio of the whisker is less than about 10, the improvement in rigidity may become insignificant. On the other hand, when the aspect ratio thereof is greater than about 50, anisotropy may increase and thus post-deformation such as distortion may occur. In order to balance rigidity and dimensional stability, whisker having an aspect ratio of about 20 to 40 is preferably used. Furthermore, when the amount of the whisker is included in an amount less than about 1 wt %, rigidity may remarkably decrease. On the other hand, when the amount thereof is included in an amount greater than about 10 wt %, sufficient scratch resistance required of parts may not be obtained.

In a preferred embodiment of the present invention, in order to improve scratch resistance of the uncoated crash pad, the anti-scratch agent may be used in the form of a mixture of synthetic silicone and modified polyethylene wax. The modified polyethylene wax may suitably include polyethylene wax (polyethylene-wax-graft-maleic anhydride) to which maleic anhydride may be grafted. Although a conventional anti-scratch agent is silicone M/B, in which siloxane and polyolefin are synthesized, the anti-scratch agent used in the present invention may result from simultaneous mixing of synthetic silicone and modified polyethylene wax, rather than direct synthesis of siloxane and polyolefin, thereby further improving scratch resistance.

When the two components are mixed in this way, surface migration may be minimized, thus improving the appearance of the part and also maximizing scratch resistance thereof.

The amount of the anti-scratch agent may suitably be about 1 to 5 wt %. When the amount thereof is less than about 1 wt %, the effect of scratch resistance may be insignificant. On the other hand, when the amount thereof is greater than about 5 wt %, a flexural modulus may decrease and thus flow marks may be generated on the surface of the part, undesirably deteriorating the aesthetic appearance.

In a preferred embodiment of the present invention, the polypropylene resin composition may have a melt index of about 25 to 43 g/10 min (230° C., 2.16 Kg), a flexural modulus of about 1500 to 2300 MPa, and/or an Izod impact strength of about 450 to 510 J/m.

The polypropylene resin composition according to the present invention includes, as the highly crystalline polypropylene resin, a mixture of polypropylene resins having different melt indexes and molecular weight distributions, and as the rubber, a mixture of ethylene-octene-based rubber and SEBS-based rubber, thus maximizing resin flowability to thereby effectively reduce appearance problems, such as flow marks, weld lines, and the like, ultimately exhibiting a good surface appearance. The inorganic filler comprising a mixture of talc and whisker and the anti-scratch agent comprising a mixture of synthetic silicone and modified polyethylene wax may be mixed at an appropriate ratio, thereby simultaneously improving the rigidity and impact performance of parts and the scratch resistance thereof.

Moreover, the density of the polypropylene resin composition according to the exemplary embodiment of the present invention may be decreased by about 3 to 4% from about 1.04 g/cm$^3$ to about 1.00 g/cm$^3$ or less, whereby release from a mold may become easy. Also, the coating process may be omitted to thus realize simple processing, thereby reducing processing costs and also preventing indoor air pollution from occurring during the coating process.

EXAMPLE

A better understanding of the present invention will be given of the following examples, which are not to be construed as limiting the present invention.

Examples 1 to 4 and Comparative Examples 1 to 13

Respective polypropylene resin compositions were prepared through a typical process using components in the amounts shown in the following Table 5. Next, respective compositions were melt-kneaded using a twin-screw extruder and thus made into pellets, after which test specimens were manufactured using an injection molding machine.

The components and properties of the materials used in the tests are shown in the following Tables 1 to 4.

(1) Polypropylene

TABLE 1

| Sample No. | Melt index [g/10 min] (230° C., 2.16 Kg) | PI* (230° C.) | Weight average molecular weight [g/mol] | Molecular weight distribution (MWD) | Isotactic peptide fraction ** |
|---|---|---|---|---|---|
| PP homo-1 | 20 | 5.9 | 220000 | 7 | 96 to 97 |
| PP block-1 | 30 | 4.8 | 300000 | 9.9 | 96 to 97 |
| PP block-2 | 80 | — | 230000 | 8.7 | 96 to 97 |
| PP block-3 | 30 | 4.4 | 250000 | 9.3 | 96 to 97 |
| PP block-4 | 80 | — | 130000 | 5.3 | 96 to 97 |

*PI (Polydispersity Index) is variable, and is an index for molecular weight distribution as the cross over point of G'(loss modulus) and G"(Storage modulus)
**Isotactic peptide fraction was measured by C$^{13}$-NMR.
*** PP homo-1: homopolypropylene
*** PP block-1, 2, 3, 4: block copolypropylene resulting from copolymerizing 88 wt % of homopolypropylene and 12 wt % of ethylene-propylene (2) Rubber

TABLE 2

| Sample No. | Melt index [g/10 min] (230° C., 2.16 Kg) | Density [Kgf/cm$^3$] | Remark |
|---|---|---|---|
| Rubber-1 | 2 | 0.86 | Ethylene-octene rubber, (Xylene soluble intrinsic viscosity 1.2 to 1.5 dL/g) |
| Rubber-2 | 4.5 | 0.89 | SEBS (Styrene-ethylene-butylene-styrene copolymer elastomer) |
| Rubber-3 | 10 | 0.87 | Ethylene-octene rubber (Xylene soluble intrinsic viscosity 0.9 to 1.1 dL/g) |

(3) Inorganic Filler

TABLE 3

| Sample No. | Type of sample | Diameter [μm] |
|---|---|---|
| Filler-1 | Talc | D50: 0.5 (average particle diameter) Density 2.7 g/ |
| Filler-2 | Whisker | Av. Length: 15 μm, Av. Dia.: 0.5 μm Aspect Ratio: 30 |

(4) Anti-Scratch Agent

TABLE 4

| Sample No. | Type of sample | Spec. |
|---|---|---|
| Anti-scratch-1 | Synthetic silicone + modified polyethylene wax | Synthetic silicone + Polyethylene wax-graft-maleic anhydride |
| Anti-scratch-2 | Synthetic silica powder | MI: 10 (230° C., 2.16 Kg) |

TABLE 5

| No. | Example 1 | Example 2 | Example 3 | Example 4 | Comp. 1 | Comp. 2 | Comp. 3 | Comp. 4 | Comp. 5 | Comp. 6 | Comp. 7 | Comp. 8 | Comp. 9 | Comp. 10 | Comp. 11 | Comp. 12 | Comp. 13 |
|---|---|---|---|---|---|---|---|---|---|---|---|---|---|---|---|---|---|
| PP Homo-1 | 10 | 10 | 10 | 10 | 10 | 10 | 10 | 10 | 10 | 10 | 10 | 10 | 10 | 10 | 10 | 10 | 10 |
| PP Block-1 | 10 | 10 | 10 | 10 | — | 10 | — | — | 10 | 10 | 10 | 10 | 10 | 10 | 10 | 10 | 10 |
| PP Block-2 | 40 | 45 | 55 | 35 | 55 | 45 | 45 | — | 45 | 64.1 | 30 | 46 | 34 | 47.5 | 37 | 46.1 | 41.9 |
| PP Block-3 | — | — | — | — | — | — | 10 | 10 | — | — | — | — | — | — | — | — | — |
| PP Block-4 | — | — | — | — | — | — | — | 45 | — | — | — | — | — | — | — | — | — |
| Rubber-1 | 10 | 10 | 5 | 15 | 10 | 10 | 10 | 10 | 10 | 0.5 | 18 | 10 | 10 | 10 | 10 | 10 | 10 |
| Rubber-2 | 10 | 10 | 5 | 15 | 10 | 10 | 10 | 10 | — | 0.4 | 17 | 10 | 10 | 10 | 10 | 10 | 10 |
| Rubber-3 | — | — | — | — | — | — | — | — | 10 | — | — | — | — | — | — | — | — |
| Filler-1 | 14 | 10 | 10 | 10 | 10 | 10 | 10 | 10 | 10 | 10 | 10 | 0 | 21 | 10 | 10 | 10 | 10 |
| Filler-2 | 3 | 3 | 3 | 3 | 3 | 3 | 3 | 3 | 3 | 3 | 3 | 3 | 3 | 0.5 | 11 | 3 | 3 |
| Anti-scratch-1 | 3 | 2 | 2 | 2 | 2 | — | 2 | 2 | 2 | 2 | 2 | 2 | 2 | 2 | 2 | 0.9 | 5.1 |
| Anti-scratch-2 | — | — | — | — | — | 2 | — | — | — | — | — | — | — | — | — | — | — |

Test Example

The test specimens of Examples 1 to 4 and Comparative Examples 1 to 13 were evaluated through the following methods.

(1) Melt index (MI): Measurement was performed in accordance with ASTM D1238 under a load of 2.16 kg at 230° C. (polypropylene) and 190° C. (polyethylene).

(2) Flexural modulus: Measurement was performed in accordance with ASTM D790 at room temperature, with a test specimen size of 127×12.7×6.4 mm, at a testing rate of 30 mm/min.

(3) Izod impact strength: A test specimen having a size of 63.5×12.7×6.4 mm and being notched was used.

(4) Scratch resistance: A 20×20 lattice pattern was scratched at 2 mm apart using an Ericsson tester, and the L value was measured before and after the evaluation of scratching (L value after scratching−initial L value), to thus calculate ΔL.

(5) Part surface appearance: Whether a flow mark was generated on the surface of the part was observed with the naked eye and evaluated. (○: good, Δ: fair (generation of some flow mark), X: poor (generation of full flow mark))

TABLE 6

| No. | Example 1 | Example 2 | Example 3 | Example 4 | Comp. 1 | Comp. 2 | Comp. 3 | Comp. 4 | Comp. 5 |
|---|---|---|---|---|---|---|---|---|---|
| Melt index [g/10 min] (230° C., 2.16 kg) | 32 | 33 | 43 | 25 | 35 | 31 | 32 | 32 | 34 |
| Density [g/cm³] | 1.01 | 0.99 | 0.99 | 0.99 | 1.01 | 1.01 | 1.01 | 1.01 | 1.01 |
| Flexural modulus [Mpa] | 2000 | 1900 | 2300 | 1810 | 2010 | 1980 | 2000 | 1900 | 1980 |
| Izod impact strength (23° C.) [J/m] | 470 | 480 | 450 | 490 | 468 | 470 | 465 | 465 | 460 |
| Scratch resistance (ΔL) | 0.3 | 0.2 | 0.2 | 0.2 | 0.4 | 1.5 | 0.5 | 0.5 | 0.5 |
| Part surface appearance | ○ | ○ | ○ | ○ | Δ | Δ | Δ | X | X |

| No. | Comp. 6 | Comp. 7 | Comp. 8 | Comp. 9 | Comp. 10 | Comp. 11 | Comp. 12 | Comp. 13 |
|---|---|---|---|---|---|---|---|---|
| Melt index [g/10 min] (230° C., 2.16 kg) | 58 | 23 | 34 | 29 | 35 | 31 | 34 | 33 |
| Density [g/cm³] | 0.99 | 0.99 | 0.98 | 1.07 | 0.97 | 1.05 | 0.99 | 0.99 |
| Flexural modulus [Mpa] | 2900 | 1600 | 1960 | 2400 | 1790 | 2600 | 1910 | 1810 |

TABLE 6-continued

| | | | | | | | | |
|---|---|---|---|---|---|---|---|---|
| Izod impact strength (23° C.) [J/m] | 65 | 590 | 475 | 440 | 485 | 350 | 480 | 485 |
| Scratch resistance (ΔL) | 0.3 | 0.6 | 0.2 | 1.5 | 0.2 | 1.9 | 2.4 | 0.1 |
| Part surface appearance | Δ | X | Δ | ○ | ○ | ○ | ○ | X |

As is apparent from the results of Table 6, in Examples 1 to 4, flexural modulus, impact strength, scratch resistance, and part surface appearance were efficiently balanced, and satisfied all of the numerical values of properties required of uncoated crash pads. FIG. 1 shows the surface appearance of a test specimen using an exemplary polypropylene resin composition of Example 1. As shown in FIG. 1, neither flow marks nor burrs were apparently generated on the surface of the test specimen.

However, in Comparative Example 1, homopolypropylene and only one kind of block copolypropylene having a wide molecular weight distribution and high melt index were used, and thus flow marks were generated on portions of the surface of the part.

In Comparative Example 2, scratch performance was deteriorated due to the use of synthetic silica powder as the anti-scratch agent, and furthermore, part surface appearance was poor.

In Comparative Examples 3 and 4, using the mixture of block copolypropylenes having different weight average molecular weights or molecular weight distributions, flow marks were generated on portions of the surface of the part in Comparative Example 3, and were severely generated on the entire surface of the part in Comparative Example 4. FIG. 2 shows the surface appearance of a test specimen using the polypropylene resin composition of Comparative Example 4. As shown in FIG. 2, flow marks were generated on the surface of the test specimen, resulting in a poor appearance.

In Comparative Example 5, flow marks were generated on the surface of the part due to the use of ethylene-octene-based rubber having a high melt index (MI) and low intrinsic viscosity (IV) as the rubber component. In Comparative Example 6, when the amount of rubber was less than 1 wt %, impact performance deteriorated and burrs were generated on the surface of the part. As in Comparative Example 7, when the amount of rubber was greater than 35 wt %, a melt index (MI) was drastically decreased and thus flow marks were generated on the surface of the part and rigidity was lowered.

In Comparative Example 8, when the amount of talc was less than 10 wt %, defects were generated on the surface of the part and rigidity was lowered. In Comparative Example 9, when the amount of talc was greater than 20 wt %, impact strength was decreased and thus scratch performance was not satisfied, and moreover, density was increased.

In Comparative Example 10, when a small amount of whisker was included, product rigidity was lowered. In Comparative Example 11, when the amount of whisker was greater than 10 wt %, scratch resistance was not satisfied.

In Comparative Example 12, when the amount of the anti-scratch agent was less than 1 wt %, scratch resistance was lowered. In Comparative Example 13, when the amount of the anti-scratch agent was greater than 5 wt %, stains were generated on the surface of the part.

Although the various exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed:

1. A polypropylene resin composition for an uncoated crash pad, comprising:
    an amount of 50 to 80 wt % of a polypropylene resin having a Polydispersity Index (PI) of 4.5 to 6.5, a weight average molecular weight of 200,000 to 350,000 g/mol, and an isotactic peptide fraction of 96% or greater as measured by a $C^{13}$-NMR method;
    an amount of 1 to 30 wt % of a rubber component having a melt index of 1 to 6 g/10 min (230° C., 2.16 Kg);
    an amount of 11 to 30 wt % of an inorganic filler comprising a mixture of an amount of 10 to 20 wt % of talc and an amount of 1 to 10 wt % of whisker; and
    an amount of 1 to 5 wt % of an anti-scratch agent,
    all the wt % based on the total weight of the polypropylene resin composition,
    wherein the polypropylene resin is a mixture of homopolypropylene and block copolypropylene,
    wherein the block copolypropylene has a molecular weight distribution (MWD) of 7 to 12, a melt index of 20 to 100 g/10 min (230° C., 2.16 Kg), and a weight average molecular weight of 200,000 to 350,000 g/mol, and
    wherein the block copolypropylene is a mixture of (i) block copolypropylene having a melt index of 20 to 40 g/10 min (230° C., 2.16 Kg) and a weight average molecular weight of 200,000 to 350,000 g/mol and (ii) block copolypropylene having a melt index of 60 to 100 g/10 min (230° C., 2.16 Kg) and a weight average molecular weight of 200,000 to 250,000 g/mol,
    wherein the rubber component comprises ethylene-octene (EO)-based rubber and styrene-ethylene-butadiene-styrene (SEBS)-based rubber which are mixed at a weight ratio of 1:1.

2. The polypropylene resin composition of claim 1, wherein the homopolypropylene has a molecular weight distribution (MWD) of 6 to 8, a melt index of 10 to 30 g/10 min (230° C., 2.16 Kg), and a weight average molecular weight of 200000 to 250000 g/mol.

3. The polypropylene resin composition of claim 1, wherein the talc has an average particle diameter of 0.1 to 1 μm.

4. The polypropylene resin composition of claim 1, wherein the whisker has an aspect ratio of 10 to 50 and an acicular shape.

5. The polypropylene resin composition of claim 1, wherein the polypropylene resin composition has a melt index of 25 to 43 g/10 min (230° C., 2.16 Kg), a flexural modulus of 1500 to 2300 MPa, and an Izod impact strength of 450 to 510 J/m.

6. The polypropylene resin composition of claim 1, consisting essentially of an amount of 50 to 80 wt % of a polypropylene resin having a Polydispersity Index (PI) of 4.5 to 6.5, a weight average molecular weight of 200,000 to 350,000 g/mol, and an isotactic peptide fraction of 96% or greater as measured by a $C^{13}$-NMR method; an amount of 1 to 30 wt % of rubber having a melt index of 1 to 6 g/10 min (230° C., 2.16 Kg); an amount of 11 to 30 wt % of an inorganic filler including a mixture of an amount of 10 to 20 wt % of talc and an amount of 1 to 10 wt % of whisker; and 1 to 5 wt % of an anti-scratch agent, all the wt % of the components are based on the total weight of the polypropylene resin.

7. The polypropylene resin composition of claim 1, consisting of an amount of 50 to 80 wt % of a polypropylene resin having a Polydispersity Index (PI) of 4.5 to 6.5, a weight average molecular weight of 200,000 to 350,000 g/mol, and an isotactic peptide fraction of 96% or greater as measured by a $C^{13}$-NMR method; an amount of 1 to 30 wt % of rubber having a melt index of 1 to 6 g/10 min (230° C., 2.16 Kg); an amount of 11 to 30 wt % of an inorganic filler including a mixture of an amount of 10 to 20 wt % of talc and an amount of 1 to 10 wt % of whisker; and 1 to 5 wt % of an anti-scratch agent all the wt % of the components are based on the total weight of the polypropylene resin.

8. A molded article comprising the polypropylene resin composition of claim 1.

9. A vehicle comprising the molded article of claim 8.

* * * * *